United States Patent
Mascuch

[11] 3,857,586
[45] Dec. 31, 1974

[54] ANTI-JACKKNIFE DEVICE HITCH
[76] Inventor: Joseph J. Mascuch, 63 Sagammore Rd., Milburn, N.J. 07041
[22] Filed: June 11, 1973
[21] Appl. No.: 368,536

[52] U.S. Cl. ............................ 280/432, 280/446 B
[51] Int. Cl. ............................................ B60d 7/00
[58] Field of Search ...................... 280/432, 446 B

[56] References Cited
UNITED STATES PATENTS

| | | | |
|---|---|---|---|
| 2,259,923 | 10/1941 | Byrne et al. | 280/432 |
| 2,668,720 | 2/1954 | Finch | 280/432 |
| 2,691,533 | 10/1954 | Koontz | 280/432 X |
| 2,838,325 | 6/1958 | Begin | 280/432 |
| 2,853,313 | 9/1958 | Finch et al. | 280/432 |
| 3,497,241 | 2/1970 | Jones | 280/432 X |
| 3,722,919 | 3/1973 | Herbert | 280/432 |

*Primary Examiner*—Leo Friaglia
*Assistant Examiner*—R. Schrecengost

[57] ABSTRACT

A Y-shaped cable hitch interconnecting the tractor of a tractor trailer truck combination with an anti-jackknife device gives greater correction of yawing at small angles of yaw.

3 Claims, 3 Drawing Figures

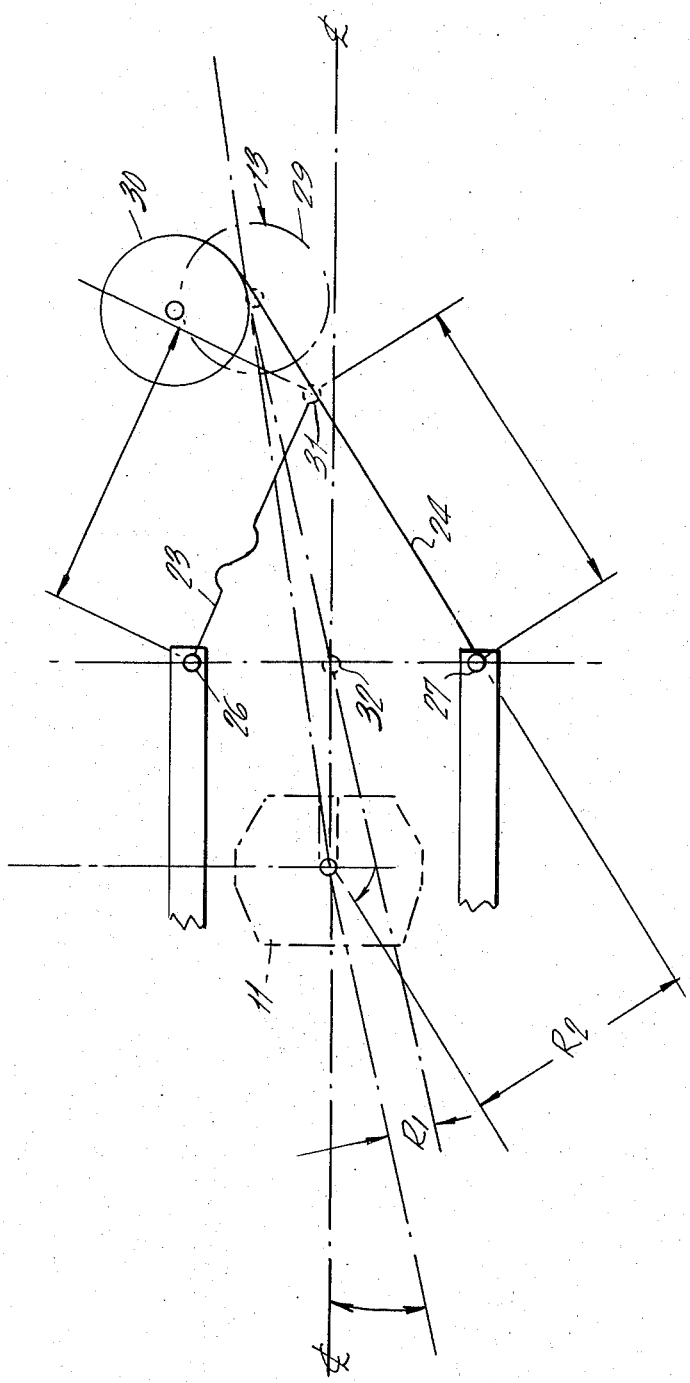

ANTI-JACKKNIFE DEVICE HITCH

BACKGROUND OF THE INVENTION

In U.S. Pat. No. 3,722,919, issued Mar. 27, 1973, which is incorporated herein by reference, there is disclosed an anti-jackknife apparatus in which a braking device is secured to the tractor of a tractor trailer combination. A drum, having a cable wound thereon is secured to the rotatable portion of the braking device. Tooth and pawl means together with a volute spring keep the cable taut at all times and application of the vehicle's wheel brakes also actuates the anti-jackknife apparatus braking device to prevent undesirable lateral movement or yawing of the trailer with respect to the tractor. This yawing if permitted to continue results in jackknifing. In the embodiment of U.S. Pat. No. 3,722,919, the free end of the cable terminates in a pelican hook which is attached through the eye of a spring loaded hitch carried by a single post mounted on the longitudinal axis of the opposite member of the tractor trailer combination. This structure is satisfactory for large angles of yaw between the tractor trailer combination.

I have found, however, that in order to control a jackknife situation it is best to apply corrective forces over the first 8° to 15° of yaw and before the yaw angles get too large. This correction may be achieved by increasing the moment arm of the hitch assembly.

Accordingly, it is an object of the present invention to increase the moment arm of prior art hitch assemblies.

Another object of the present invention is to provide a Y-shaped hitch assembly for an anti-jackknife device in which the tractor end of the hitch is secured to spaced posts.

A further object of the present invention is to provide a hitch assembly which is easily engaged and disengaged.

SUMMARY OF THE INVENTION

An anti-jackknife hitch in accordance with the present invention is formed of two primary cables each freely coupled at one end to spaced posts carried by the frame of a tractor. The opposite ends of the primary cables are engaged by a ring which is sufficiently large to also receive a quick disconnect hook coupled to the free end of a cable wound upon the trailer borne portion of the anti-jackknife device. The Y-shaped configuration of the hitch provides a large moment arm and increases the ability of the anti-jackknife device to correct lateral movement of the trailer with respect to the tractor.

DESCRIPTION OF THE DRAWINGS

In the accompanying drawings forming part hereof similar parts have been given the same reference numerals in which drawings;

FIG. 3 is a somewhat diagrammatic representation of the moments about the fifth wheel of the tractor as the trailer begins to jackknife and the effect of the present invention compared with the hitch of U.S. Pat. No. 3,722,919.

GENERAL DESCRIPTION

Figure 1:
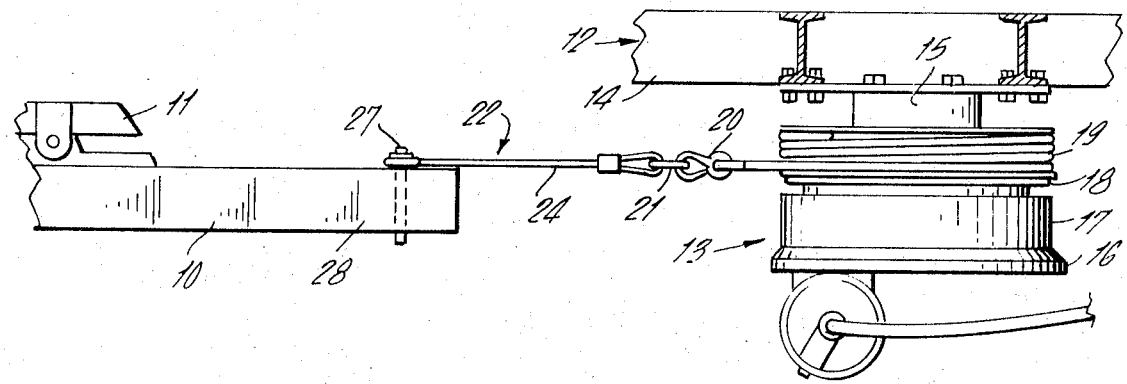
FIG. 1 is a view in side elevation of the anti-jackknife device of U.S. Pat. No. 3,722,919, together with the hitch of the present invention.
Figure 2:
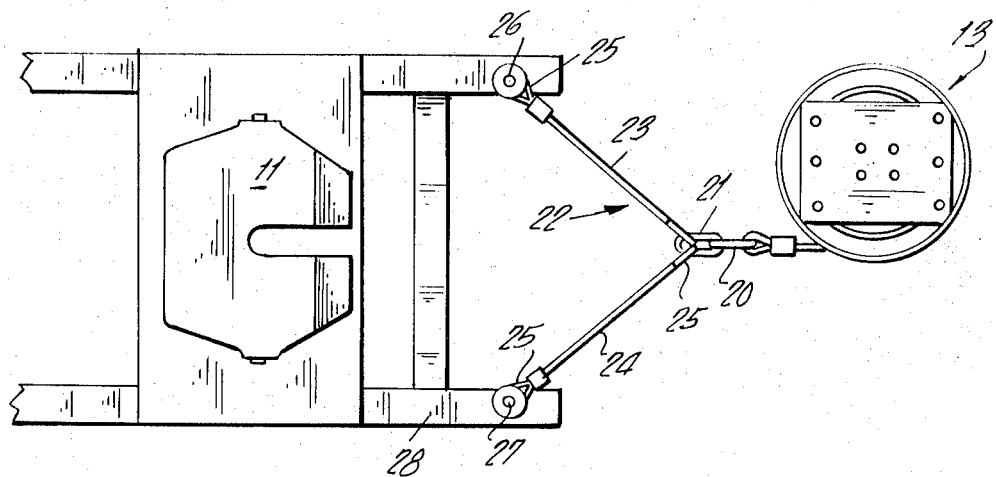
FIG. 2 is a plan view of the anti-jackknife device and hitch of FIG. 1.

Referring to the drawings and particularly to FIGS. 1, 2 and 3, indicates the frame of a tractor upon which is secured a fifth wheel 11. The fifth wheel 11 which is secured inboard of the end of the frame is used to couple the trailer 12 to the tractor in the well-known manner.

An anti-jackknife unit 13 made in accordance with the teaching of U.S. Pat. No. 3,722,919 is secured beneath the frame 14 of the trailer 12. The anti-jackknife device 13 includes an axle 15 rigidly secured to the underside of the trailer frame 14. A brake assembly stator or bottom plate 16 is secured to the other end of the axle 15. A brake drum 17 surrounds the brake assembly and its brake shoes (not shown) and receives thereon a cable drum assembly 18. The cable drum assembly is interconnected by a pawl and ratchet tooth mechanism to keep the cable 19 thereon under spring tension at all times, all as more fully set forth in U.S. Pat. No. 3,722,919.

The free end of the cable 19 is secured to a pelican hook 20 or some other quick disconnect coupling member for engagement with a ring 21.

The ring 21 forms one end of a Y-shaped hitch generally indicated at 22 which includes two arms 23, 24 formed of two lengths of cable having a thimble 25 or some other eye forming member secured at each end thereof. Two of the thimbles 25 are slipped around the ring 21 as shown in FIG. 2 to secure one end of each cable 23, 24 thereto. The opposite ends of the cables are slipped around two spaced posts 26, 27 secured to the frame 29 of the tractor 10 rearward of the fifth wheel 11. The cables 23, 24 are swingable upon the posts 26, 27 in response to the relative motion of the tractor trailer members.

Referring to FIG. 3 there is shown, somewhat diagrammatically, the manner in which the Y-shaped hitch together with the braking device, operates to control jackknifing. As the braking device 13 is moved by the sideways motion or yawing of the trailer about the fifth wheel from its normal position indicated at 29 to a second position shown at 30. The cable ends 25 of the hitch together with the ring 21 will move from a position on the center line of the tractor trailer rig toward a lateral position indicated at 31. One of the cables, (in the example shown as cable 24) will become taut and the other cable 23 will become slack. Due to the widely spaced location of the posts 26, 27 with respect to the centerline of the tractor trailer rig, there is provided a restoring moment at a small angle of yaw which serves to correct the tendency to jackknife at a time when it is easier to make such correction, namely before the angle of yaw becomes too great. The moment arm formed by the taut cable is greatly increased by reason of the location of the post 27 as compared with the moment arm afforded by a single post located at 32 as suggested in the prior art.

It will be seen from FIG. 1 that $R_2$, the restoring moment for the hitch structure of the present invention, is much greater than $R_1$ the restoring moment for a single point center line positioned hitch for small angles of yaw, such as 8 to 15°. Only at angles of the order of 90° does $R_1$ equal $R_2$.

Although the example illustrated shows the braking device 13 secured to the trailer it will be apparent to those skilled in the art that the braking device could be secured to the tractor and the hitch to the trailer without departing from the spirit of the invention.

What is claimed is:

1. An anti-jackknife device hitch for use with a tractor trailer rig having a braking device in the form of an axle mounted on one end of the elements of the rig, a brake stator secured to the free end of the axle, a complemental brake means freely carried upon the axle, a cable drum assembly rotatably mounted on the axle and coupled to the brake means and a cable secured at one end and received upon the cable drum, the improvement which comprises a Y-shaped hitch secured at one end to the free end of the cable and at its other two ends to spaced pivot points carried by the other member of the tractor trailer rig.

2. A hitch according to claim 1 in which the Y-shaped hitch is formed of two lengths of cable linked together at the cable drum end thereof and swingably carried at their other ends upon the pivot points.

3. A hitch according to claim 2 in which the pivot points are laterally spaced on each side of the longitudinal center line of the tractor trailer rig.

* * * * *